United States Patent
Smith

(10) Patent No.: US 10,296,588 B2
(45) Date of Patent: May 21, 2019

(54) BUILD OF MATERIAL PRODUCTION SYSTEM

(75) Inventor: Michael H. Smith, Milton (AU)

(73) Assignee: Red Hat, Inc., Raleigh, NC (US)

(*) Notice: Subject to any disclaimer, the term of this patent is extended or adjusted under 35 U.S.C. 154(b) by 1323 days.

(21) Appl. No.: 11/809,467

(22) Filed: May 31, 2007

(65) Prior Publication Data

US 2008/0301564 A1    Dec. 4, 2008

(51) Int. Cl.
| | | |
|---|---|---|
| G06F 17/28 | (2006.01) | |
| G06Q 10/06 | (2012.01) | |
| G06Q 10/10 | (2012.01) | |

(52) U.S. Cl.
CPC ........ G06F 17/2881 (2013.01); G06F 17/289 (2013.01); G06Q 10/06 (2013.01); G06Q 10/10 (2013.01); Y04S 10/54 (2013.01)

(58) Field of Classification Search
CPC .............. G06F 17/2836; G06F 17/289; G06F 17/30669; G06Q 10/06; G06Q 10/063114
USPC ......................................... 715/731, 264–265
See application file for complete search history.

(56) References Cited

U.S. PATENT DOCUMENTS

| | | | | |
|---|---|---|---|---|
| 5,448,695 A | * | 9/1995 | Douglas et al. ............. 715/809 |
| 5,568,383 A | * | 10/1996 | Johnson et al. .................. 704/2 |
| 5,630,070 A | * | 5/1997 | Dietrich ................. G06Q 10/06 |
| | | | | 705/7.23 |
| 5,630,081 A | * | 5/1997 | Rybicki .............. G06F 3/04817 |
| | | | | 715/839 |
| 5,664,183 A | * | 9/1997 | Cirulli et al. |
| 5,760,775 A | * | 6/1998 | Sklut et al. .................... 715/839 |
| 5,777,876 A | * | 7/1998 | Beauchesne .................... 700/95 |
| 5,835,898 A | * | 11/1998 | Borg et al. .................... 705/7.12 |
| 5,836,444 A | * | 11/1998 | Hoevel et al. ............... 206/63.5 |
| 5,848,386 A | * | 12/1998 | Motoyama ........................ 704/5 |
| 5,917,484 A | * | 6/1999 | Mullaney ...................... 715/703 |
| 5,983,182 A | * | 11/1999 | Moore ........................... 704/270 |
| 5,987,402 A | | 11/1999 | Murata et al. |
| 6,002,396 A | * | 12/1999 | Davies .......................... 715/763 |
| 6,110,213 A | * | 8/2000 | Vinciarelli et al. ............... 703/1 |
| 6,139,201 A | | 10/2000 | Carbonell et al. |
| 6,175,839 B1 | * | 1/2001 | Takao et al. .................. 715/205 |
| 6,208,956 B1 | * | 3/2001 | Motoyama ........................ 704/2 |
| 6,272,508 B1 | * | 8/2001 | Dyne et al. .................... 715/210 |
| 6,336,053 B1 | * | 1/2002 | Beatty ................ G05B 19/4188 |
| | | | | 700/108 |
| 6,393,332 B1 | * | 5/2002 | Gleditsch ............... G06Q 10/06 |
| | | | | 700/100 |

(Continued)

OTHER PUBLICATIONS

Walsh, N., et al., "DocBook: The Definitive Guide Version 1.0.2", published Oct. 15, 1999, O'Rielly & Associates, Sabastopol, California, 1999.

(Continued)

*Primary Examiner* — Amy Ng
*Assistant Examiner* — William Wong
(74) *Attorney, Agent, or Firm* — Lowenstein Sandler LLP

(57) ABSTRACT

Some embodiments of a build of material production system have been presented. In one embodiment, a graphical user interface (GUI) is presented via a client machine on factory floor to allow a user to submit a request to build a document from a master document in a predetermined natural language and a predetermined format. Further, a visual representation of a current build status of the document is provided in the GUI.

6 Claims, 5 Drawing Sheets

(56) References Cited

U.S. PATENT DOCUMENTS

| | | | |
|---|---|---|---|
| 6,407,820 B1 * | 6/2002 | Hansen | G06F 3/1205 358/1.12 |
| 6,411,314 B1 * | 6/2002 | Hansen et al. | 715/769 |
| 6,526,426 B1 * | 2/2003 | Lakritz | 715/264 |
| 6,589,291 B1 | 7/2003 | Boag et al. | |
| 6,598,015 B1 | 7/2003 | Peterson et al. | |
| 6,654,737 B1 * | 11/2003 | Nunez | |
| 6,879,997 B1 | 4/2005 | Ketola et al. | |
| 6,944,622 B1 * | 9/2005 | Mitchell | G06Q 10/103 |
| 7,139,696 B2 | 11/2006 | Tokieda et al. | |
| 7,171,348 B2 * | 1/2007 | Scanlan | 704/2 |
| 7,292,987 B2 * | 11/2007 | Flanagan et al. | 705/345 |
| 7,356,458 B1 | 4/2008 | Gonos | |
| 7,428,578 B1 * | 9/2008 | Hull et al. | 709/206 |
| 7,512,532 B2 | 3/2009 | Kimpara | |
| 7,567,941 B2 * | 7/2009 | Sagi et al. | 705/404 |
| 7,580,960 B2 | 8/2009 | Travieso et al. | |
| 7,584,216 B2 | 9/2009 | Travieso et al. | |
| 7,627,817 B2 | 12/2009 | Travieso et al. | |
| 7,716,037 B2 * | 5/2010 | Precoda et al. | 704/2 |
| 7,802,179 B2 | 9/2010 | Bissonnette et al. | |
| 8,205,151 B2 | 6/2012 | Smith | |
| 8,645,816 B1 | 2/2014 | Kelley et al. | |
| 2001/0029455 A1 | 10/2001 | Chin et al. | |
| 2001/0041494 A1 * | 11/2001 | Barad et al. | 446/268 |
| 2001/0044868 A1 * | 11/2001 | Rortocil et al. | 710/129 |
| 2002/0012554 A1 * | 1/2002 | Haller | 400/70 |
| 2002/0016803 A1 * | 2/2002 | Ryan et al. | 707/527 |
| 2002/0049702 A1 | 4/2002 | Aizikowitz et al. | |
| 2002/0054101 A1 * | 5/2002 | Beatty | 345/764 |
| 2002/0055798 A1 * | 5/2002 | Haye | 700/95 |
| 2002/0069196 A1 * | 6/2002 | Betros et al. | 707/7 |
| 2002/0077805 A1 * | 6/2002 | Hecht et al. | 704/2 |
| 2002/0103632 A1 * | 8/2002 | Dutta | G06F 17/289 704/2 |
| 2002/0111967 A1 | 8/2002 | Nagase | |
| 2002/0169842 A1 * | 11/2002 | Christensen et al. | 709/206 |
| 2002/0193983 A1 * | 12/2002 | Tokieda et al. | 704/2 |
| 2002/0198904 A1 * | 12/2002 | Robles et al. | 707/500 |
| 2003/0037076 A1 | 2/2003 | Bravery et al. | |
| 2003/0040900 A1 * | 2/2003 | D'Agostini | 704/2 |
| 2003/0115552 A1 * | 6/2003 | Jahnke et al. | 715/536 |
| 2003/0130863 A1 * | 7/2003 | Grey | G06Q 30/06 705/1.1 |
| 2003/0166373 A1 * | 9/2003 | Whitney et al. | 446/71 |
| 2003/0171977 A1 * | 9/2003 | Singh | G06Q 20/20 709/217 |
| 2003/0203343 A1 * | 10/2003 | Milner | 434/157 |
| 2003/0225569 A1 * | 12/2003 | Shimamura | 704/2 |
| 2004/0060005 A1 * | 3/2004 | Vasey | 715/513 |
| 2004/0061891 A1 * | 4/2004 | Philpot | H04L 29/06 358/1.15 |
| 2004/0125406 A1 * | 7/2004 | McManus et al. | 358/1.18 |
| 2004/0138872 A1 | 7/2004 | Nir | |
| 2004/0167784 A1 | 8/2004 | Travieso et al. | |
| 2004/0168132 A1 * | 8/2004 | Travieso et al. | 715/536 |
| 2004/0205671 A1 * | 10/2004 | Sukehiro et al. | 715/532 |
| 2004/0261013 A1 * | 12/2004 | Wynn | G06Q 10/10 715/229 |
| 2004/0268306 A1 | 12/2004 | Cheng et al. | |
| 2005/0019077 A1 * | 1/2005 | Hatta | H04N 1/00132 400/62 |
| 2005/0021859 A1 | 1/2005 | Willian et al. | |
| 2005/0028080 A1 | 2/2005 | Challenger et al. | |
| 2005/0030290 A1 * | 2/2005 | de Brebisson | 345/169 |
| 2005/0055236 A1 * | 3/2005 | Bondy et al. | 705/1 |
| 2005/0060648 A1 | 3/2005 | Fennelly et al. | |
| 2005/0131768 A1 * | 6/2005 | Rodriguez et al. | 705/26 |
| 2005/0132284 A1 | 6/2005 | Lloyd et al. | |
| 2005/0160359 A1 | 7/2005 | Falk et al. | |
| 2005/0018593 A1 | 8/2005 | Jung et al. | |
| 2005/0240905 A1 | 10/2005 | Pournasseh et al. | |
| 2006/0015763 A1 | 1/2006 | Nakajima | |
| 2006/0036612 A1 * | 2/2006 | Harrop et al. | 707/100 |
| 2006/0048016 A1 * | 3/2006 | Reindler | G06Q 10/06 714/47.1 |
| 2006/0064631 A1 * | 3/2006 | Parker | 715/500 |
| 2006/0075329 A1 * | 4/2006 | Sullivan et al. | 715/507 |
| 2006/0080616 A1 * | 4/2006 | Vogel et al. | 715/769 |
| 2006/0100850 A1 * | 5/2006 | Lee | 704/8 |
| 2006/0136387 A1 | 6/2006 | Yalovsky et al. | |
| 2006/0136510 A1 | 6/2006 | Voronov et al. | |
| 2006/0136824 A1 * | 6/2006 | Lin | 715/531 |
| 2006/0167577 A1 * | 7/2006 | Clark et al. | 700/97 |
| 2006/0200766 A1 | 9/2006 | Lakritz | |
| 2006/0242606 A1 * | 10/2006 | Lin | G06F 8/34 715/855 |
| 2006/0294418 A1 | 12/2006 | Fuchs | |
| 2007/0027670 A1 | 2/2007 | Verhey-Henke et al. | |
| 2007/0078696 A1 * | 4/2007 | Hardin, Jr. | G06Q 10/06 705/7.22 |
| 2007/0156744 A1 | 7/2007 | Harrington | |
| 2007/0180359 A1 | 8/2007 | Giannetti | |
| 2007/0192685 A1 | 8/2007 | Morales et al. | |
| 2007/0230750 A1 * | 10/2007 | Ikeda et al. | 382/123 |
| 2007/0282594 A1 | 12/2007 | Spina | |
| 2008/0040397 A1 | 2/2008 | Herbeck et al. | |
| 2008/0082317 A1 | 4/2008 | Rosart et al. | |
| 2008/0155390 A1 | 6/2008 | Karim et al. | |
| 2008/0172637 A1 * | 7/2008 | Chang et al. | 715/846 |
| 2008/0189096 A1 | 8/2008 | Apte et al. | |
| 2008/0235569 A1 | 9/2008 | Arun et al. | |
| 2008/0281804 A1 * | 11/2008 | Zhao et al. | 707/5 |
| 2008/0288474 A1 | 11/2008 | Chin et al. | |
| 2008/0300863 A1 | 12/2008 | Smith | |
| 2009/0083848 A1 * | 3/2009 | Lawlor et al. | 726/18 |
| 2009/0089263 A1 | 4/2009 | McHugh et al. | |
| 2009/0125497 A1 | 5/2009 | Jiang et al. | |
| 2009/0171961 A1 | 7/2009 | Fredrickson | |
| 2010/0174981 A1 | 7/2010 | Jiang et al. | |
| 2012/0173971 A1 | 7/2012 | Sefton et al. | |

OTHER PUBLICATIONS

"XSL Transformations", accessed at http://en.wikipedia.org/wiki/XSLT on Apr. 9, 2007, last updated Mar. 28, 2007, 7 pages.

"FOP", accessed at http://en.wikipedia.org/wiki/FOP on Apr. 9, 2007, last updated Apr. 1, 2007, 2 pages.

"Stylesheet Language", accessed at http://en.wikipedia.org/wiki/Stylesheet on Apr. 2, 2007, last updated Feb. 26, 2007, 2 pages.

"DocBook", accessed at http://en.wikipedia.org/wiki/DocBook on Apr. 2, 2007, last updated Mar. 24, 2007, 4 pages.

Walsh, N., et al., "DocBook: The Definitive Guide", Sebastopol, California: O'Reilly & Associates, Inc., 1999.

Senellart, Pierre, et al., "Systran Translation Stylesheets: Machine Translation driven by XSLT", Published 2005 by RenderX, pp. 1-15.

Office Action dated May 26, 2010 for U.S. Appl. No. 11/809,462, filed May 31, 2007, 25 pages.

Office Action dated May 28, 2010 for U.S. Appl. No. 11/809,628, filed May 31, 2007, 41 pages.

Office Action for U.S. Appl. No. 11/809,462, dated Oct. 13, 2010.

Office Action for U.S. Appl. No. 11/809,628, dated Oct. 27, 2010.

Office Action for U.S. Appl. No. 11/809,462, dated Dec. 21, 2011.

Office Action for U.S. Appl. No. 11/809,628, dated Aug. 25, 2011.

USPTO, Office Action for U.S. Appl. No. 11/809,462, dated Jul. 23, 2012.

USPTO, Notice of Allowance for U.S. Appl. No. 11/809,628, dated Feb. 17, 2012.

* cited by examiner

BUILD OF MATERIAL PRODUCTION SYSTEM

TECHNICAL FIELD

Embodiments of the present invention relate to automated production environment, and more specifically to a build of material production system.

BACKGROUND

With the globalization of commerce, numerous products are marketed in many different countries. Since different natural languages are typically used in different countries, different versions of a master document associated with a product are needed when the product is marketed in different countries. For example, products marketed in the United States, Mexico, and France needs documentation (e.g., user manuals, product literature, safety warnings, etc.) in English, Spanish, and French, respectively. Depending on the market served by a factory assembling the products, the factory may need a specific version of the documentation.

Conventionally, a version of the product documentation in a relevant natural language is provided to a factory serving a particular market. When the master document is changed, an updated version is provided to the factory. If the factory has to switch to serve a different market in a different country, then a different version of the product documentation has to be provided to the factory so that the factory can make the switch. For instance, the factory may be assembling products for the United States and has been provided with an English version of the product documentation. When the manufacturer starts to offer the product in Mexico, the factory may need a Spanish version of the product documentation in order to assemble the products for Mexico. Currently, some manufacturers send a master copy of the product documentation offsite to a translator to translate the documentation into Spanish. Then the translation is provided to a printing facility to produce hardcopies of the documentation in Spanish and the hardcopies are delivered to the factory.

One problem with the above approach is that it is time consuming to generate the hardcopies of the documentation in Spanish and deliver the hardcopies to the factory. Thus, the factory may not respond to changes in the demand for the products in different markets quickly and flexibly.

BRIEF DESCRIPTION OF THE DRAWINGS

The present invention is illustrated by way of example, and not by way of limitation, in the figures of the accompanying drawings and in which.

DETAILED DESCRIPTION

Figure 1A:
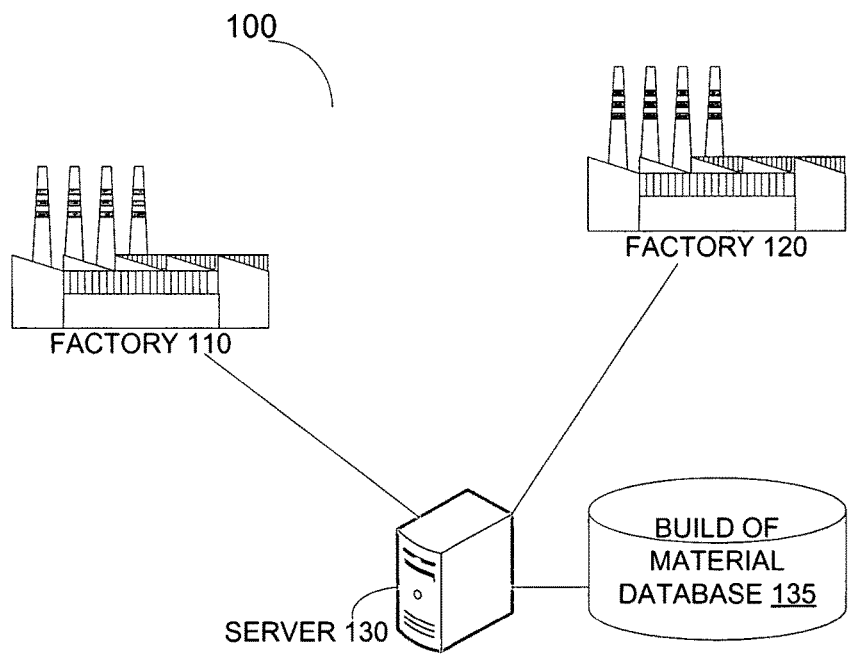
FIG. 1A illustrates one embodiment of a build of material production system.

Described herein are some embodiments of a build of material production system. In one embodiment, a graphical user interface (GUI) is presented via a client machine on factory floor to allow a user to submit a request to build a document from a master document in a predetermined natural language and a predetermined format. Further, a visual representation of a current build status of the document is provided in the GUI. Details of some embodiments of the build of material production system are described below.

A document as used herein broadly refers to a piece of literary work written in a natural language. As mentioned in the background section, a natural language as used herein generally refers to a language written or spoken by humans for general-purpose communication, such as English, French, German, etc. Some examples of a document include a user manual, a product guide, etc. Documents may be encoded in various markup languages, such as, hypertext markup language (HTML), extensible markup language (XML), etc. In general, a markup language provides a set of tags to allow an author to mark up the structure and/or semantic content of a document without dictating the specific appearance of an output generated from the document. In other words, the presentation and the content of the document are separated such that the author of the document does not have to specify or describe the presentation of the document while composing the content of the document. As used herein, to build a document from a master document generally refers to generating the document based on the master document in a specific natural language and/or format according to a user request, where the substantive content of the document is about the same as the master document.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, compact disc read-only memories (CD-ROMs), and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1A illustrates one embodiment of a build of material production system 100. The system 100 includes two factories 110 and 120, a server 130, and a build of material database 135, which are communicatively coupled to each other via networks, such as intranet, the Internet, etc. The factories 110 and 120 may or may not locate in the same geographical area. For example, the factory 110 may locate in California, U.S.A. while the factory 120 may locate in Mexico City, Mexico. Likewise, the server 130 and the build of material database 135 may or may not locate at the same geographical area as either of the factories 110 and 120. Referring back to the above example, the server 130 and the build of material database 135 may locate in Sydney, Australia.

In some embodiments, both factories 110 and 120 assemble the same product. However, the product may be packaged with different versions of documentation (e.g., a user manual, product literature, safety warning, etc.) associated with the product being assembled in the factories 110 and 120. Referring back to the above example, the product assembled in California is packaged with a user manual in English while the product assembled in Mexico City is packaged with a user manual in Spanish.

In some embodiments, the server 130 is operable to build different versions of the documentation in response to requests from either one of the factories 110 and 120 and to send the documents built to the factories 110 and 120, which may print hardcopies of the documents built. For instance, the server 130 may execute a document building script using a document publishing tool (e.g., DocBook) to build an output document from a master document in a format and/or in a natural language requested. For example, the master document may be in a markup language (e.g., Extensible Markup Language (XML)) and is in English. The output document may be translated into Spanish and is encoded in a different markup language, such as Hypertext Markup Language (HTML). Further, the server 130 may store a copy of the output document and/or a translation of the master document in the build of material database 135. When the server 130 later receives another request to build another document from the master document in the same natural language, but in a different format, the server 130 may retrieve the translation from the build of material database 135 so that the server 130 does not have to translate the master document again. Using the translation retrieved, the server 130 may build another output document in a format different from the document built earlier (e.g., Portable Document Format (PDF)).

Note that the specific natural languages and document formats used in illustrating the techniques in the current disclosure are merely some of the examples. The concepts disclosed herein are not limited to these specific natural languages and document formats.

Figure 1B:
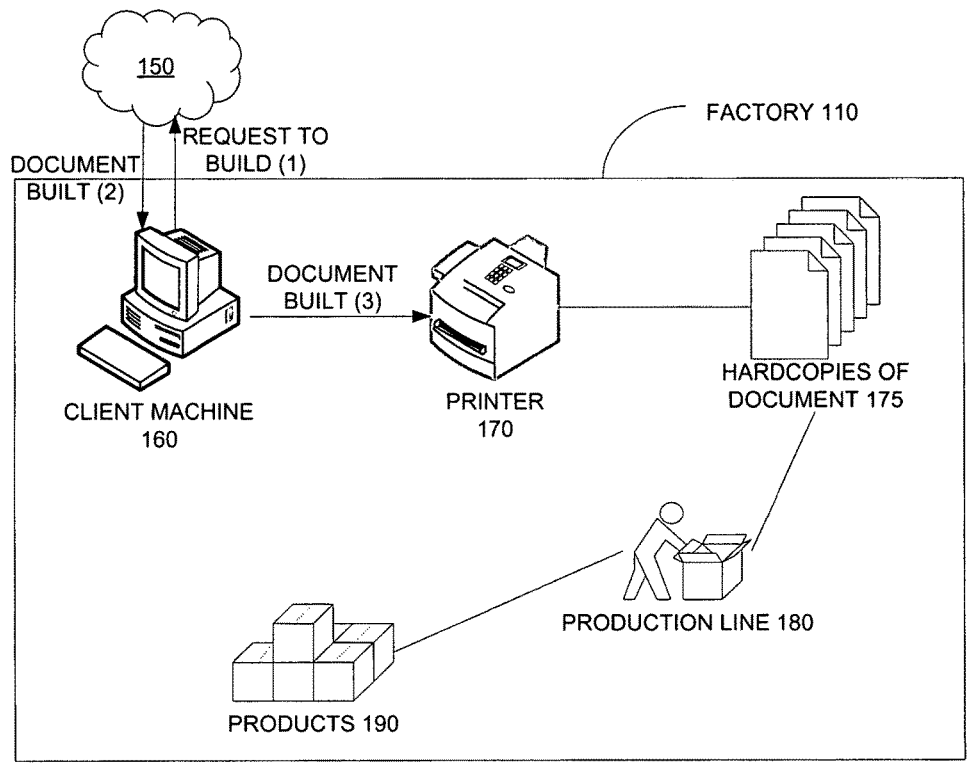
FIG. 1B illustrates one embodiment of a factory within a build of material production system.

FIG. 1B illustrates one embodiment of the factory 110 in greater details. The factory 110 includes a client machine 160, a printer 170, and a production line 180. The client machine 160 is communicatively coupled to a network 150, which may include an intranet, the Internet, etc. Via the network 150, the client machine 160 communicates with a server, such as server 130 in FIG. 1A. The client machine 160 is described in more detail below with reference to FIG. 2A.

In some embodiments, the client machine 160 sends a request (1) to build a document from a master document to the server via the network 150. The request (1) may specify a natural language (e.g., English) and/or a format (e.g., HTML) in which the document should be. The master document is associated with a product being assembled in the factory 110. Referring back to the above example, the document includes a user manual of the product. In response to the request (1), the server builds the document in the requested natural language and/or the format and sends the document (2) to the client machine 160 via the network 150. The client machine 160 sends the document built (3) to the printer 170, which produces hardcopies 175 of the document built (3). The hardcopies 175 are packaged with the products at the production line 180. In some embodiments, the production line 180 includes automated machinery to package the hardcopies 175 with the products. For example, the automated machinery may put a hardcopy of the document into a box of the product and then seal the box. Alternatively, the automated machinery may paste a hardcopy of the document on a carton of the product. In some embodiments, one or more persons work in the production line 180 to manually pack the hardcopies 175 with the products. As such, the factory 110 outputs assembled products 190 packaged with the hardcopies 175.

Since the client machine 160 on the factory floor may request the document (2) in a particular format and/or a particular natural language directly from the server, the client machine 160 may order the document (2) as needed. In other words, there is no need to pre-order multiple versions of the master document in many different formats and/or natural languages, where some of the versions are eventually not used in the factory 110. Moreover, being able to request a tailor-made version of the master document at the factory floor allows the factory 110 to quickly switch to producing a different version of the product in response to changes in various market. For example, if there is a surge in the demand for the product in Mexico, the factory 110, which may have been producing products packaged with English user manuals, may quickly switch to packaging the products with Spanish user manuals in order to re-allocate at least some of the capacity of the factory 110 to meet the surge in demand in Mexico. As a result, the flexibility of the build of material production system is improved.

Figure 2A:
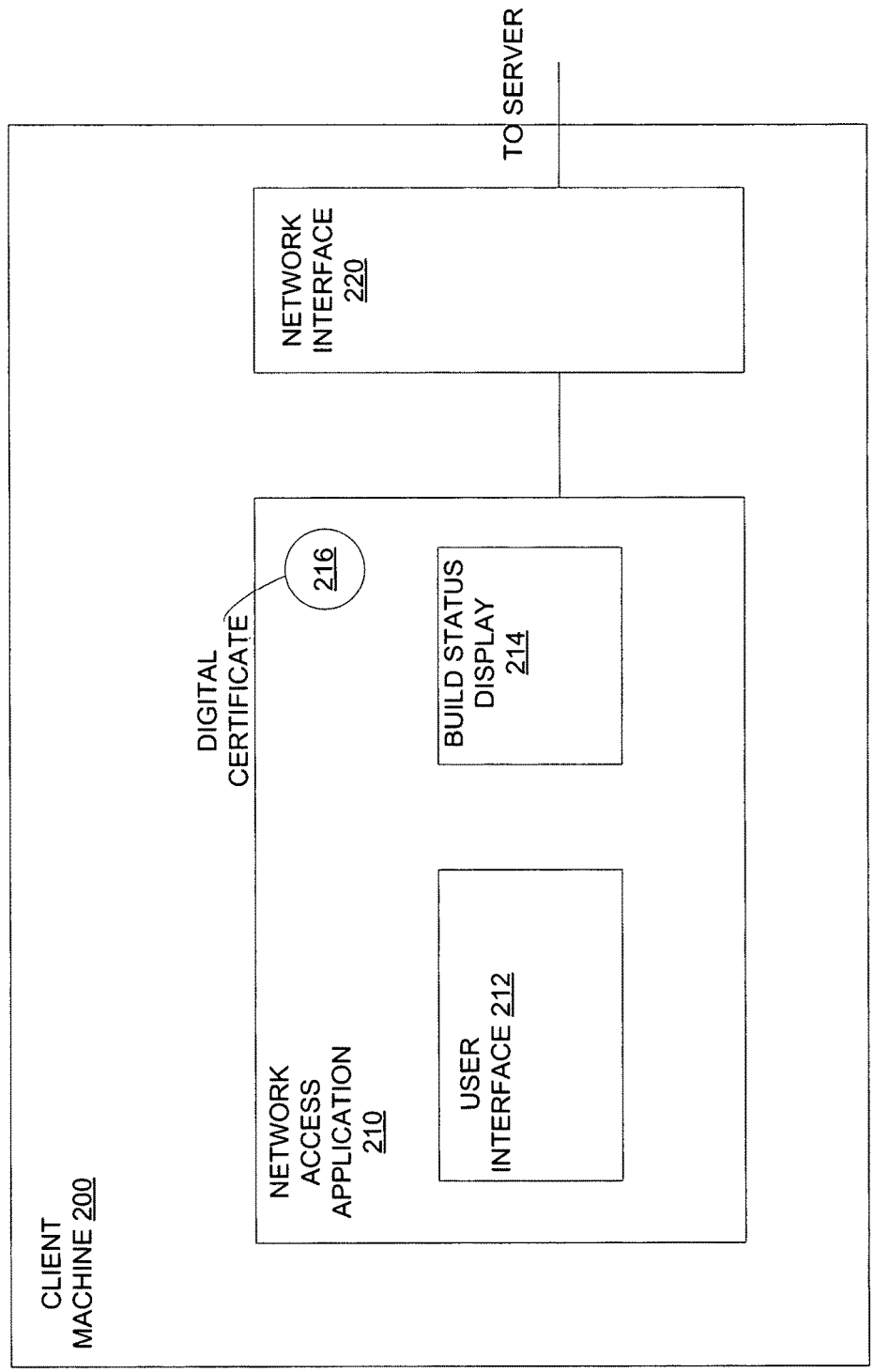
FIG. 2A illustrates one embodiment of a client machine.

FIG. 2A illustrates a functional block diagram of one embodiment of a client machine. The client machine 200 may be implemented with a computing machine, such as the one illustrated in FIG. 4. The client machine 200 includes a network access application 210 and a network interface 220, which are operatively coupled to each other. The network access application 210 includes a user interface 212, a build status display 214, and a digital certificate 216.

In some embodiments, the network interface 220 communicatively couples to a network, such as the network 150 in FIG. 1B, to communicate with a server, such as the server 130 in FIG. 1A. Via the network interface 220, the client machine 200 may send requests to build documents to the server and receive the documents built from the server. The network interface 220 is operatively coupled to the network access application 210.

In some embodiments, the network access application 210 is bonded with the digital certificate 216, which is used to authenticate a user. For example, the network access application 210 may send a copy of the digital certificate 216 to the server to be validated. If the server successfully validates the digital certificate 216, then the user is authenticated and access by the user may be granted. After the user is authenticated, the network access application 210 presents a user interface 212 to allow the user to submit requests to build documents from a master document. For instance, the user interface 212 may include a text entry field in which the user may enter a path and/or a filename of the master document. Alternatively, the user interface 212 may include a list of master documents, from which the user may select. The user interface 212 may further include a user interface control (e.g., a SUBMIT button) for the user to submit the request.

Once the request is submitted, the network access application 210 may render a build status display 214 to indicate the current build status of the request. In some embodiments, the build status display 214 includes a visual representation of the current build status, where the color of the visual representation changes in response to changes in the build status. For example, the color of the visual representation is red when the build is in progress and the color of the visual representation changes to green when the build completes. Alternatively, different icons, texts, and/or patterns, etc. may be displayed in the build status display 214 depending on the current build status.

Figure 2B:
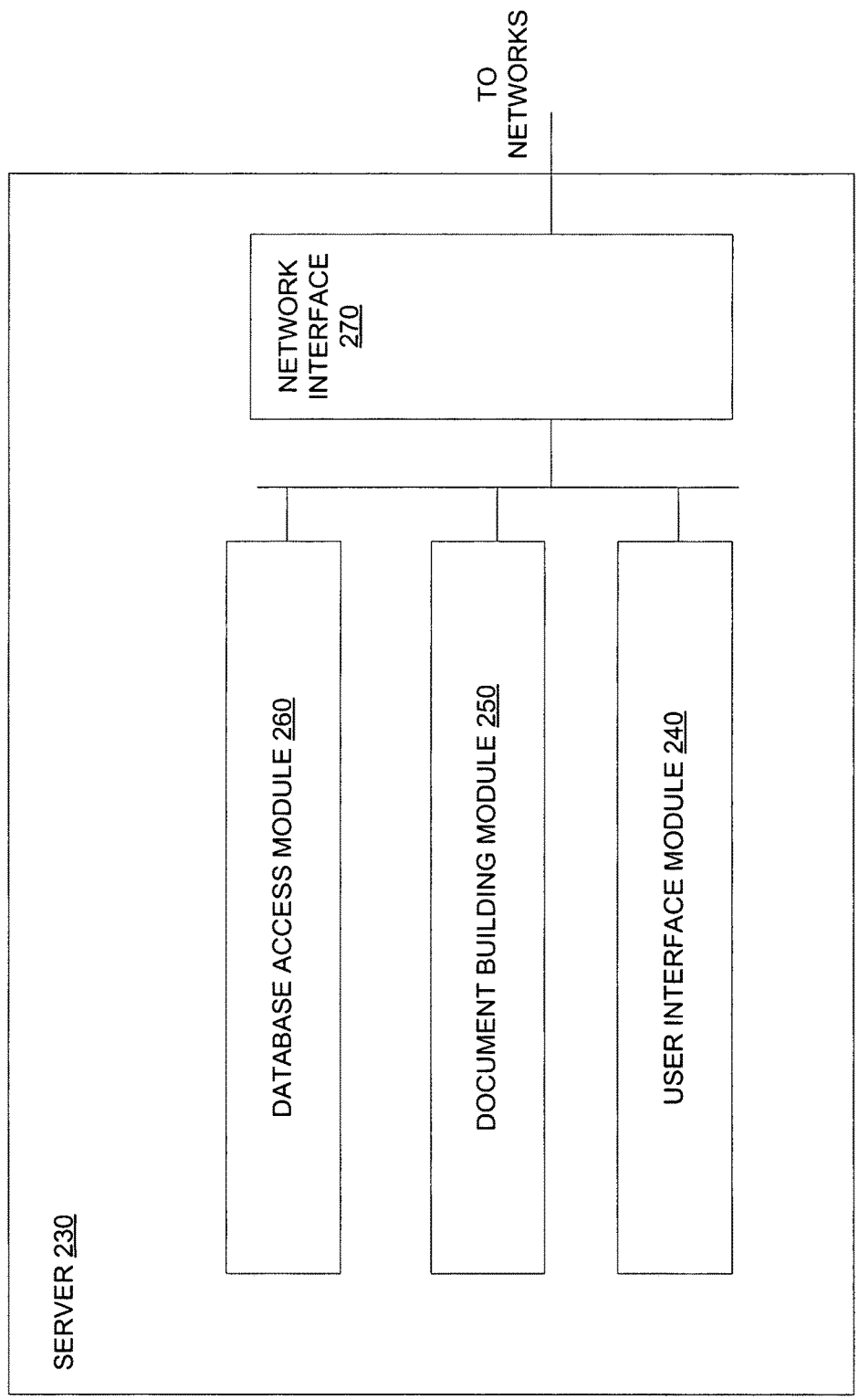
FIG. 2B illustrates one embodiment of a server.

FIG. 2B illustrates a functional block diagram of one embodiment of a server. The server 230 may be implemented with a computing machine, such as the one illustrated in FIG. 4. The server 230 includes a database access module 260, a document building module 250, a user interface module 240, and a network interface 270, operatively coupled to each other. Via the network interface 270, the server 230 is communicatively coupled to client machines (e.g., the client machine 200 in FIG. 2A) and a build of material database (e.g., the build of material database 135 in FIG. 1B).

In some embodiments, the user interface module 240 generates a user interface (e.g., a GUI) to be presented to a user by a network access application (e.g., a browser) executable on a client machine coupled to the server 230. Using the user interface, the user may submit a request to build a document from a master document in a particular natural language and/or a particular format (e.g., PDF). The user interface module 240 further provides a display to indicate a current build status, such as the build status display 214 in FIG. 2A.

In response to the user's request to build the document, the document building module 250 may run a script (e.g., build.xml) to generate the document from the master document in the requested natural language and/or format. In some embodiments, the database access module 260 may retrieve a translation of the document in the requested natural language if the translation is available in the build of material database.

Figure 3:
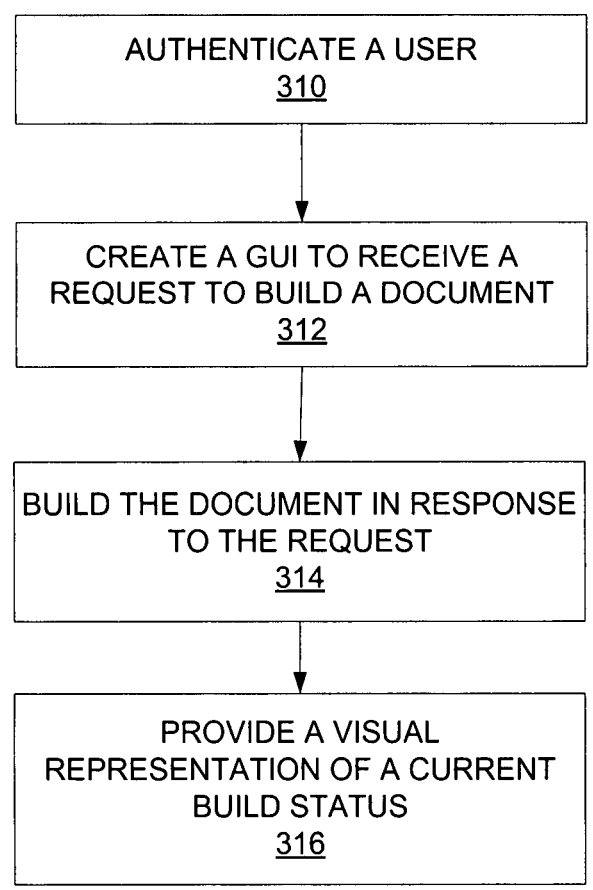
FIG. 3 illustrates one embodiment of a build of material production flow.

FIG. 3 illustrates one embodiment of a build of material production flow. The process may be performed by processing logic that comprises hardware (e.g., circuitry, dedicated logic, programmable logic, microcode, etc.), software (such as instructions run on a processing device), firmware, or a combination thereof. For example, the server 230 in FIG. 2B may perform at least part of the process described below.

In some embodiments, processing logic authenticates a user (processing block 310). For example, processing logic may examine a digital certificate bonded with a network access application (e.g., a browser) to determine if the digital certificate is valid. If so, the user is authenticated. If the user is not authenticated, the process ends.

After successfully authenticating the user, processing logic creates a graphical user interface (GUI) to receive a request from the user to build a document from a master document (processing block 312). As discussed above, the GUI may include user interface controls, such as text entry fields, lists, buttons, etc., to allow the user to submit the request. In response to the request, processing logic builds the document accordingly (processing block 314). For example, processing logic at the remote server may execute a document build script (e.g., build.xml) to build the document from the master document.

In some embodiments, processing logic provides a visual representation of a current build status in the GUI (processing block 316). As discussed above, the visual representation may change color and/or display different icons, texts, and/or patterns, etc. in response to changes in the current build status.

Figure 4:
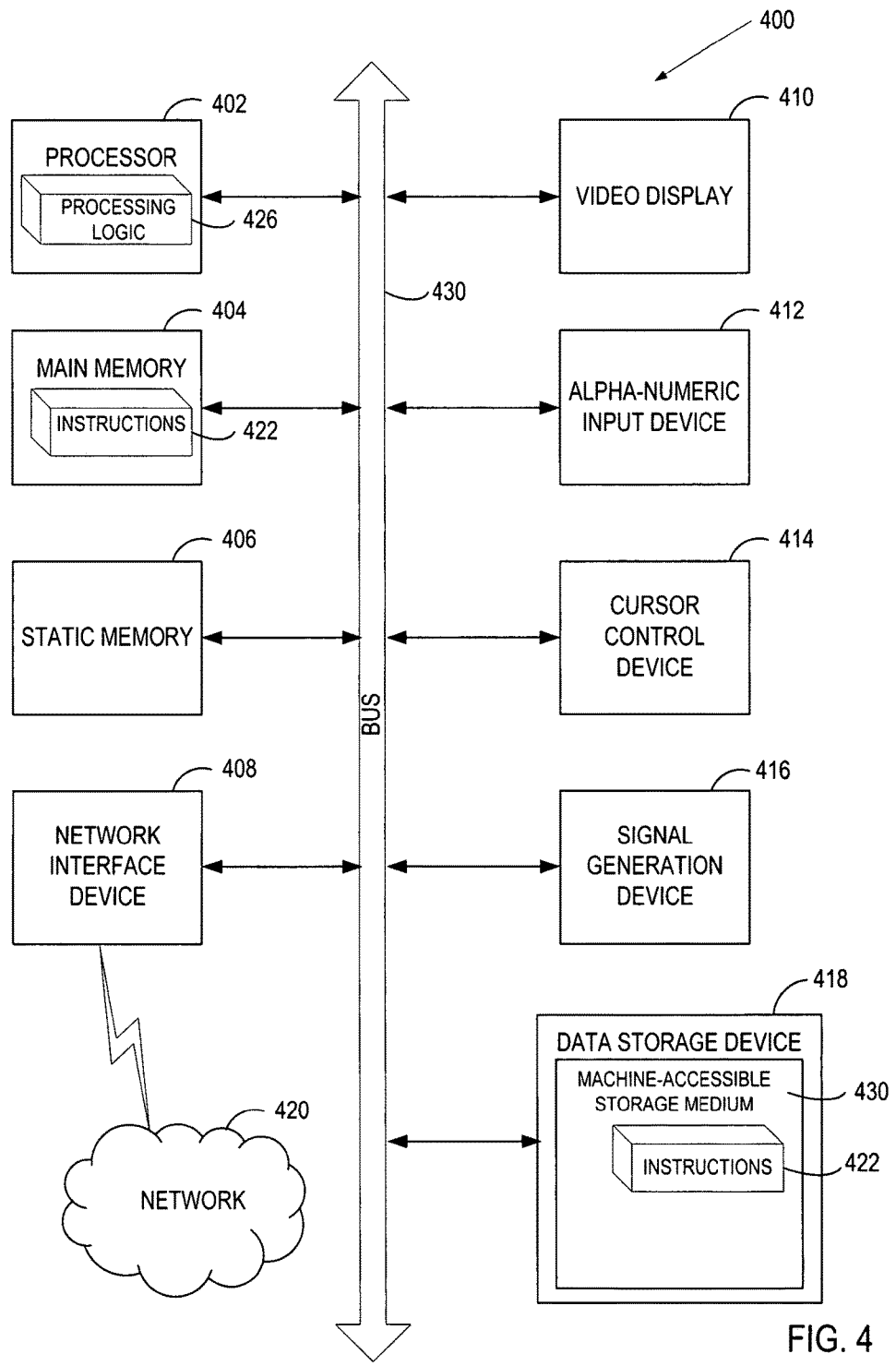
FIG. 4 illustrates a block diagram of an exemplary computer system.

FIG. 4 illustrates a diagrammatic representation of a machine in the exemplary form of a computer system 400 within which a set of instructions, for causing the machine to perform any one or more of the methodologies discussed herein, may be executed. In some alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a PC, a tablet PC, a set-top box (STB), a PDA, a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 430 (also known as a machine-readable storage medium) on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-accessible storage media. The software 422 may further be transmitted or received over a network 420 via the network interface device 408.

While the machine-accessible storage medium 430 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, etc.

Thus, some embodiments of a publishing tool to translate documents have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
receiving, via a graphical user interface (GUI), a first request for a first output document, wherein the first request is associated with an entry field of the GUI that specifies a path and a file name of a master document associated with a manufactured product, and wherein the master document represents a user manual of the manufactured product;
transmitting, to a document build server, the first request for the first output document based on the master document, wherein the first request specifies the master document, a first document format of the first output document and a first natural language of the first output document, wherein the first document format is encoded using a markup language;
providing, via the GUI, a first visual representation of a first build status of the first output document, wherein the first build status is visually encoded using a plurality of colors, wherein a first color of the plurality of colors corresponds to an in-progress status and a second color corresponds to a complete status, and wherein the first visual representation of the first build status further comprises a text description of the first build status;
causing a first plurality of units of the manufactured product to be packaged, at a factory, with printed copies of the first output document in response to the first output document being built;
detecting a surge in demand for the manufactured product in a geographical area associated with a second natural language;
transmitting, to the document build server, a second request for a second output document based on the master document, wherein the second request specifies a second document format and the second natural language for the second output document, wherein the second document format is encoded using the markup language;
providing, via the GUI, a second visual representation of a second build status of the second output document, wherein the second build status is visually encoded using the plurality of colors, wherein the first color of the plurality of colors corresponds to the in-progress status and the second color corresponds to the complete status; and
re-allocating at least a portion of manufacturing capacity at the factory that packages the manufactured product with printed copies of the first output document in the first natural language to meet the detected surge in demand by causing a second plurality of units of the manufactured product to be packaged with printed copies of the second output document in the second natural language in response to the second output document being built.

2. The method of claim 1, further comprising:
authenticating, using a digital certificate, a user associated with the first request.

3. The method of claim 1, further comprising:
providing the GUI via a network access application communicatively coupled to the build server.

4. The method of claim 1, further comprising:
retrieving a translation of the master document to the first natural language from a database in response to the first request.

5. The method of claim 1, wherein the first visual representation of the first build status of the first output document further comprises an icon reflecting the first build status.

6. The method of claim 1, wherein the first visual representation of the first build status of the first output document further comprises a graphic pattern reflecting the first build status.

* * * * *